(No Model.) 2 Sheets—Sheet 1.
M. O'GORMAN.
GEAR CUTTING MACHINE.
No. 330,510. Patented Nov. 17, 1885.
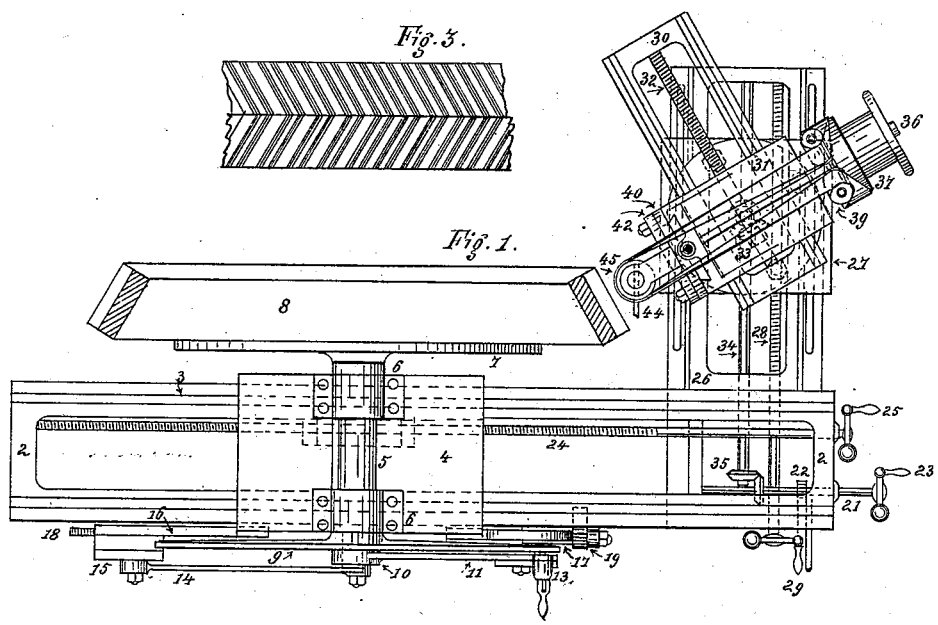
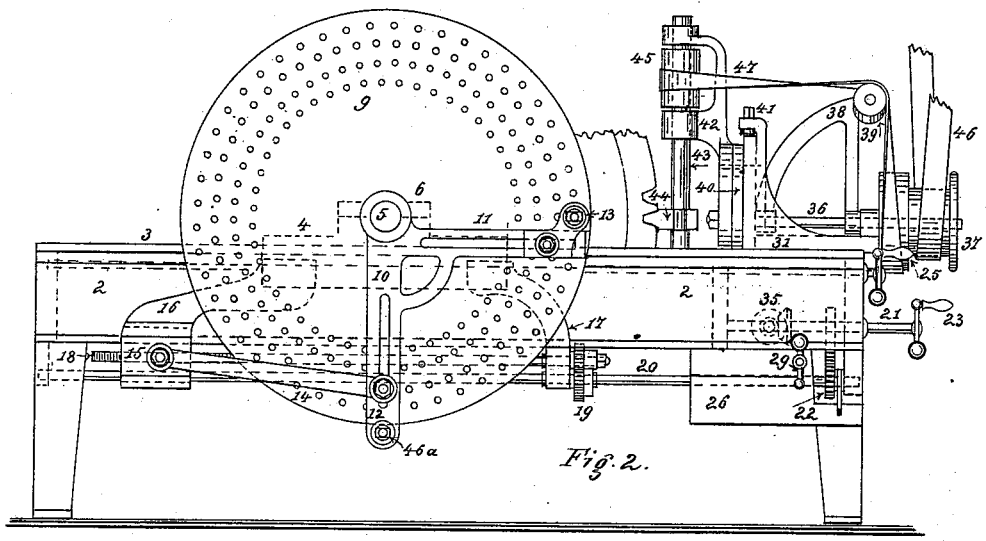
WITNESSES:
C. Ph. Wagner
Alfred Weber
INVENTOR
Michael O'Gorman
BY
Benj. A. Dare
ATTORNEYS (No Model.) 2 Sheets—Sheet 2.
M. O'GORMAN.
GEAR CUTTING MACHINE.
No. 330,510. Patented Nov. 17, 1885.
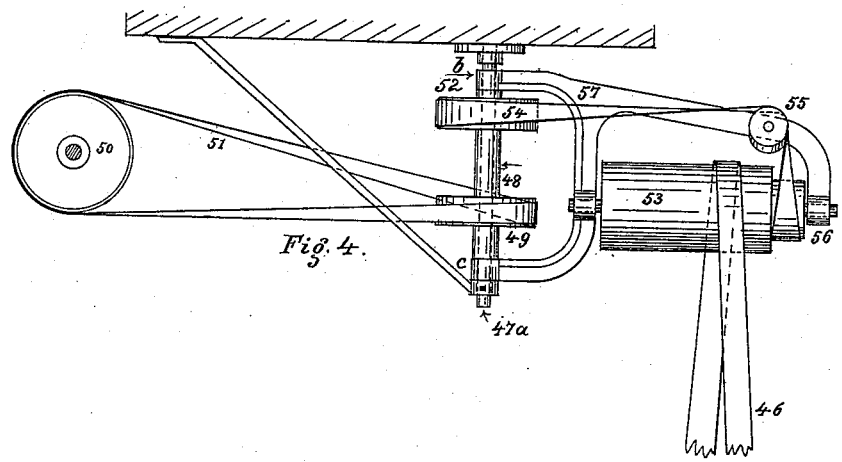
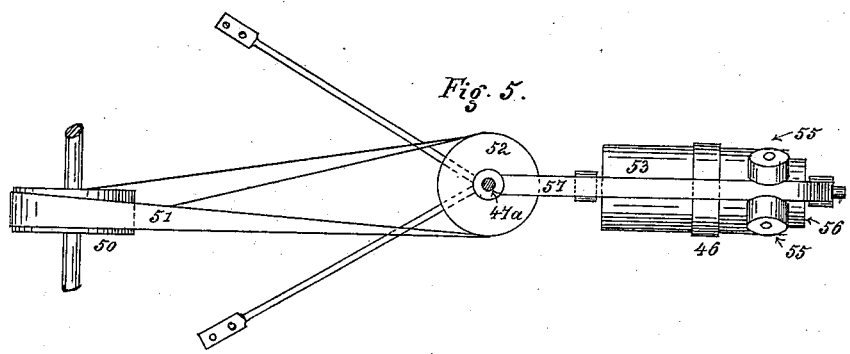
WITNESSES:
C. Ph. Wagner.
Alfred Wibe
INVENTOR
Michael O'Gorman
BY
Benj. A. Dare
ATTORNEY

UNITED STATES PATENT OFFICE.

MICHAEL O'GORMAN, OF JERSEY CITY, NEW JERSEY.

GEAR-CUTTING MACHINE.

SPECIFICATION forming part of Letters Patent No. 330,510, dated November 17, 1885.

Application filed May 3, 1884. Serial No. 130,244. (No model.)

*To all whom it may concern:*

Be it known that I, MICHAEL O'GORMAN, a citizen of the United States, and a resident of Jersey City, in the county of Hudson and State of New Jersey, have invented certain new and useful Improvements in Gear-Cutting Machines, of which the following is a specification.

The object of my invention is to produce a machine for cutting teeth in gear-wheels of any description known as "spur," "bevel," "face angle or spiral," and "worm" gears, all the parts of the machine being readily adjusted to suit the varied requirements of the work, and operated with dispatch, ease, and accuracy, which cannot be done with the machines now in use for that purpose, which will be hereinafter more fully explained, referring to the drawings, in which—

Figure 1 represents a plan view of my machine. Fig. 2 represents a side elevation of same. Fig. 3 shows the face of an angle or spiral gear; Fig. 4, an elevation of swinging frame for supporting belt-wheels and drums. Fig. 5 is a plan view of same.

Similar figures refer to similar parts.

2 is the bed, with ways 3, on which the saddle or carriage 4 moves. 5 is the arbor or spindle journaled in bearings 6 on said carriage. To one end of the spindle is attached the face-plate 7, for securing the work to while it is operated upon, as shown at 8, Fig. 1. To the other end of the spindle 5 is fastened the dividing or spacing disk 9, which is pierced with holes for spacing off the work. The arbor 5 extends through the said disk 9, and is of sufficient length to receive the vibrating bell-crank 10, with arms 11 and 12 extending across the face of the said disk. Upon the arm 11 is placed the adjustable stop-pin 13, and to the other arm, 12, is pivoted the connecting-rod 14, which is also connected to the sliding block 15. To the carriage 4 are secured two arms, 16 and 17, for supporting an adjusting-screw, 18, which moves the block 15 forward or backward in guides on the arm 16. The said screw 18 is operated by a train of small gears, 19, from the shaft 20, which is also connected to shaft 21 by other gears, 22, and the whole revolved by handle 23. The carriage 4 with all its attachments is moved forward or backward upon the bed 2 by the screw 24 and handle 25. At one end of the bed 2 and secured thereto is another bed, 26, set at right angles with bed 2, on which the carriage 27 moves, being operated by the screw 28 and handle 29. Upon said carriage 27 the movable slide 30 is pivoted, which will swing around to any angle desired. On the slide 30 the cutter-spindle carriage 31 travels, and is moved in either direction by means of the screw 32, connected by bevel-gears 33 to shaft 34, which is also connected to shaft 21 by bevel-gears 35. On the carriage 31 is fastened a shaft, 36, on which the driving-pulleys 37 revolve and the swinging frame 38 vibrates, and on the said frame 38 are two idle-pulleys, 39, for guiding the belt to the pulley on the vertical spindle shaft. To the carriage 31 is attached an adjustable head, 40, which is adjusted either up or down by screw 41, and to the said head 40 is pivoted the spindle-frame 42, which carries the cutter-spindle 43 with cutter 44 and pulley 45, and the spindle can be set to work at any angle to suit the style of the tooth to be cut straight or spiral.

The operation of the machine is as follows: Power being applied to the belt 46, it transmits its motion through pulleys 37 to belt 47, which travels over idlers 39, thence to pulley 45 on spindle 43, revolving same. The gear-blank 8 having been previously fastened to face-plate 7, the screw 24 is turned by the handle 25, which draws the carriage 4 with blank 8 up to the revolving cutter 44 to the point desired. Then the handle 23 is turned, which turns the screw 32 by means of the bevel-gears 33 35 and shaft 34, and thereby drawing the cutter across the face of the wheel 8 and cutting out space for the tooth. The motion of the handle is then reversed and the cutter moved back to its former position. The stop-pin 13 is withdrawn, and the disk 9 moved one or more holes, as may be desired, the pin 13 holding the disk 9 firmly, when the operation above described is repeated for the next tooth, and so on until the whole wheel is complete.

For cutting spiral or angle teeth on spur or bevel gears, the operation above described is repeated for moving the cutter, and the blank 8 is revolved a part of a revolution (in direction of arrow) the distance required for the angle of the tooth. I accomplish this by engaging the gears 22 on shaft 21 and 20 together, which revolves said shaft 20 and transmits motion to screw 18 by gears 19 and turning same, thereby moving the slide-block 15 back in the arm 16, rotating the bell-crank 10 the same distance by the connecting-rod 14, which is adjusted to any point desired in slot on the arm 12 for moving the disk 9 a greater or less distance, the said arm and disk 9 being clamped together by clamps 46, which firmly secures the disk 9 and arm 12 together, and thereby relieving the stop-pin 13 of all strain while the cutter is traversing across the face of the work. By turning the shaft 21 the cutter is moved across the face of the blank, as heretofore described, and at the same time the shaft 20 is revolved and screw 18 turned, which revolves the blank 8 the distance required for the angle of tooth by the connecting-rod 14, bell-crank 10, and disk 9. When spur or bevel gears are to be cut of the ordinary style, the gears 22 on shafts 20 and 21 are disconnected and all the mechanism connected thereto remains at rest, and the screws 18 with attachments and the bell-crank are used for adjusting the space of the teeth to be cut, and the machine is especially adapted for cutting worms, worm-gears, and all work of this class, such as racks, internal gears, and chain sprocket-wheels.

For guiding the belt 46 properly on pulleys 37 in any of the various positions it may travel or be placed, I suspend from the ceiling a vertically-fixed shaft, 47ª, on which the sleeve 48 revolves freely, and to the said sleeve 48 is attached the pulley 49, which is connected to the driving-pulley 50 by belt 51, and attached to same sleeve is a pulley, 52, which transmits its motion to the drum 53 by belt 54 passing over idlers 55, thence to pulley 56 on drum 53. The said drum 53 is journaled in a swinging frame, 57, which rotates or swings on vertical shaft 47ª at *c* and *b*, and enables the drum 53 to be always directly over the pulley 37. The said drum 53 is of sufficient length to provide for any lateral movement that may be required.

By this device I am enabled to transmit to the belt-pulley 37 at any point and in any direction or angle desired within the radius of the end of the drum 53 from the center of the vertical shaft 47ª and the belt automatically adjusting itself to suit any angle, as the frame 57 will swing freely around the vertical shaft 47ª to any point and the drum 53 providing for any lateral movement required, whereas in the present mode of transmitting power in various directions some of the pulleys require to be adjusted to make the belts travel correctly over the pulleys.

What I claim is—

1. The bell-crank 10, with arms 11 and 12, the stop-pin 13, connecting-rod 14, sliding block 15, adjusting-screw 18, supporting-arms 16 and 17, in combination with carriage 4, substantially as for the purpose described.

2. The combination of the shaft 21, gears 22, shaft 20, gears 19, screw 18, and bed 2, substantially as for the purpose specified.

3. The carriage 27, with movable slide 30, pivoted thereto, the carriage 31, screws 32, bevel-gears 33, in combination with shaft 34, bevel-gears 35, shaft 21, and bed 26 and 2, substantially as for the purpose described.

4. The carriage 31, with arm 38, idle-pulleys 39, and driving-pulleys 37, substantially as for the purpose specified.

5. The cutter spindle-frame 42, pivoted to carriage 31, sliding head 40, adjusting-screw 41, spindle 43, cutter 44, and pulley 45, substantially as described, for the purpose specified.

6. The vertical shaft 47ª, with sleeve 48, and swinging frame 57, attached thereto, substantially as for the purpose specified.

7. The swinging frame 57, with idle-pulleys 55, and drum 53, attached thereto, substantially as for the purpose specified.

Signed at New York, in the county of New York and State of New York, this 22d day of April, A. D. 1884.

MICHAEL O'GORMAN.

Witnesses:
C. TH. WAGNER,
E. W. LITTLE.